Aug. 22, 1939.  F. B. HALE ET AL  2,170,142
FILTER IMPREGNATING MACHINE
Filed June 28, 1932   8 Sheets-Sheet 2

INVENTORS
Frank B. Hale
Frank A. Logan
BY
Millard F. Peake, Jr
ATTORNEY.

Aug. 22, 1939.  F. B. HALE ET AL  2,170,142
FILTER IMPREGNATING MACHINE
Filed June 28, 1932    8 Sheets-Sheet 3

INVENTORS
Frank B. Hale
Frank A. Logan
BY Millard F. Peake, Jr.
ATTORNEY.

Aug. 22, 1939.　　F. B. HALE ET AL　　2,170,142
FILTER IMPREGNATING MACHINE
Filed June 28, 1932　　8 Sheets-Sheet 5

INVENTORS
Frank B. Hale
BY　Frank A. Logan

Millard F. Peake, Jr.
ATTORNEY.

Aug. 22, 1939.  F. B. HALE ET AL  2,170,142
FILTER IMPREGNATING MACHINE
Filed June 28, 1932   8 Sheets-Sheet 7

INVENTORS
Frank B. Hale
Frank A. Logan
BY Millard F. Peake, Jr.
ATTORNEY.

Aug. 22, 1939.  F. B. HALE ET AL  2,170,142
FILTER IMPREGNATING MACHINE
Filed June 28, 1932  8 Sheets-Sheet 8

INVENTORS
Frank B. Hale
Frank A. Logan
BY Millard F. Peake, Jr
ATTORNEY.

Patented Aug. 22, 1939

2,170,142

UNITED STATES PATENT OFFICE 2,170,142

FILTER IMPREGNATING MACHINE

Frank B. Hale, Bel Air, Md., and Frank A. Logan, Sarasota, Fla.

Application June 28, 1932, Serial No. 619,730

50 Claims. (Cl. 91—18)

(Granted under the act of March 3, 1883, as amended April 30, 1928; 370 O. G. 757)

The invention described herein may be manufactured and used by or for the Government for governmental purposes, without the payment to us of any royalty thereon.

The invention relates to filters for gases, vapors and smokes and more particularly has reference to a machine for impregnating such filters with finely divided or pulverized material.

It has been found that the efficiency of a gas filter is increased by the clogging of the pores of the filter material by a finely divided substance. Heretofore, difficulties encountered in impregnating filters have been in treating the entire surfaces thereof with the impregnant as well as impregnating several filters, either separately or simultaneously, to a like degree. Another disadvantage in devices for this purpose resides in the fact that their operation is not continuous, it being necessary to completely arrest their operation while loading the same with filters to be impregnated and while removing impregnated filters therefrom.

It will hence be apparent that the major object of our invention is the provision of a machine of simple design and easy operation for the impregnation of filters with a finely divided material.

An equally important object of our invention is the provision of a machine for impregnating a plurality of filters with finely divided material, each being impregnated to an equal degree.

Another object of our invention is to devise a filter impregnating machine of such character that one set of filters may be loaded or removed from the machine while another set of filters are undergoing impregnation, thus affording a continuous operation of the device.

Still another object of the invention is the provision of an automatic feeding device for the impregnating material which determines the quantity of the material employed in each impregnation.

Yet another object of our invention is to provide a means for automatically regulating the degree of impregnation of the filters undergoing treatment in a filter impregnating machine, by means of a novel automatic timing device.

Still another object of our invention is to devise a filter impregnating machine having means associated therewith for brushing the excess of material used in impregnation off the surface of the filters undergoing treatment.

A further object of our invention is the provision of an impregnating machine including two impregnating compartments in which the filters undergoing treatment are rotatably mounted, a hopper containing the impregnating material being associated with the device so as to communicate with either chamber and means provided on the machine for passing a current of air through a chamber in the hopper and impregnating either compartment.

A still further object of the invention is to provide means for removing from the impregnation compartment of an impregnating machine, the excess impregnating material therein.

Yet a further object of our invention is the provision of means in a filter impregnating machine for connecting the unimpregnated filters to a vacuum pump while the filters are being rotated in an air stream carrying particles of impregnant.

With these and other objects in view, which may be incident to our improvements, the invention consists in the parts and combination to be hereinafter set forth and claimed, with the understanding that the several necessary elements comprising our invention may be varied in construction, proportions and arrangement without departing from the spirit and scope of the appended claims.

One manner of practically effecting the concept of our invention is to mount upon a suitable supporting frame, an impregnating box divided into compartments or chambers, each of these compartments having hollow rotatable shafts therein on which are mounted the filter material. Associated with the impregnating box and adapted to form a closure for each of the impregnating compartments, when the filter material therein is undergoing treatment, is an airtight top or cover which is connected through a flexible conduit to a hopper containing the impregnating material and to a source of air under pressure.

For evacuating air from within filters being treated, each of their hollow mounting shafts leads to a manifold which is connected to a vacuum pump. One manifold is provided for each impregnating chamber so that through suitable control valves only one chamber at a time is connected to the vacuum pump. As well as the exhausting apparatus, just mentioned, a suction blower is employed for the purpose of removing excess impregnating material from the impregnating chambers.

Our invention also comprehends the rotation of the filters undergoing treatment, a brushing mechanism for each filter, a timing mechanism and a feeding device from a main power source.

By means of these last two units, which control the quantity of impregnating material employed and the time of impregnation, the degree of impregnation of the filters is determined.

In order to make our invention more clearly understood, we have shown in the accompanying drawings, means for carrying the same into practical effect without limiting the improvements in their useful applications to the particular constructions, which for the purpose of explanation, have been made the subject of illustration.

In the drawings.

Throughout the drawings similar reference numerals refer to like parts in the different views.

Figure 1:
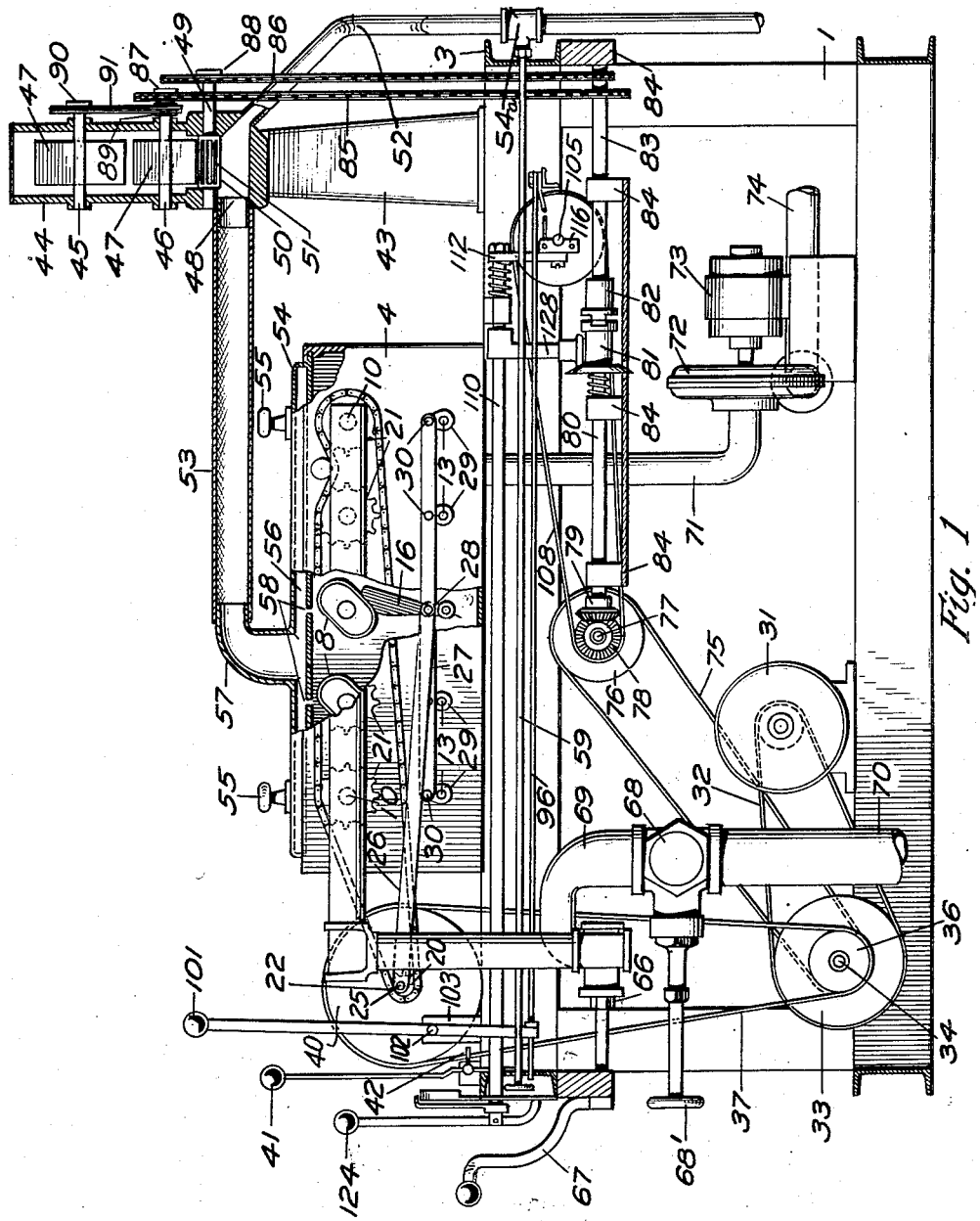
Figure 1 is a side view, partly in section, of the machine forming the subject matter of our invention.
Figure 2:
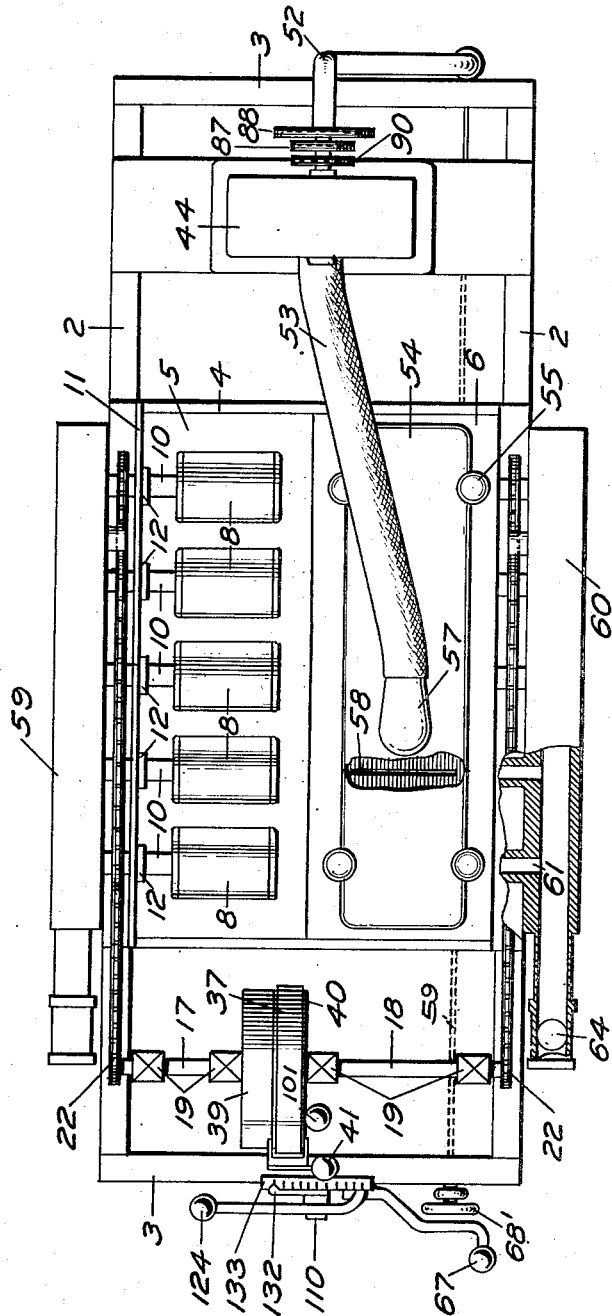
Figure 2 is a top plan view, partly in section, of the machine disclosed in Figure 1.
Figure 3:
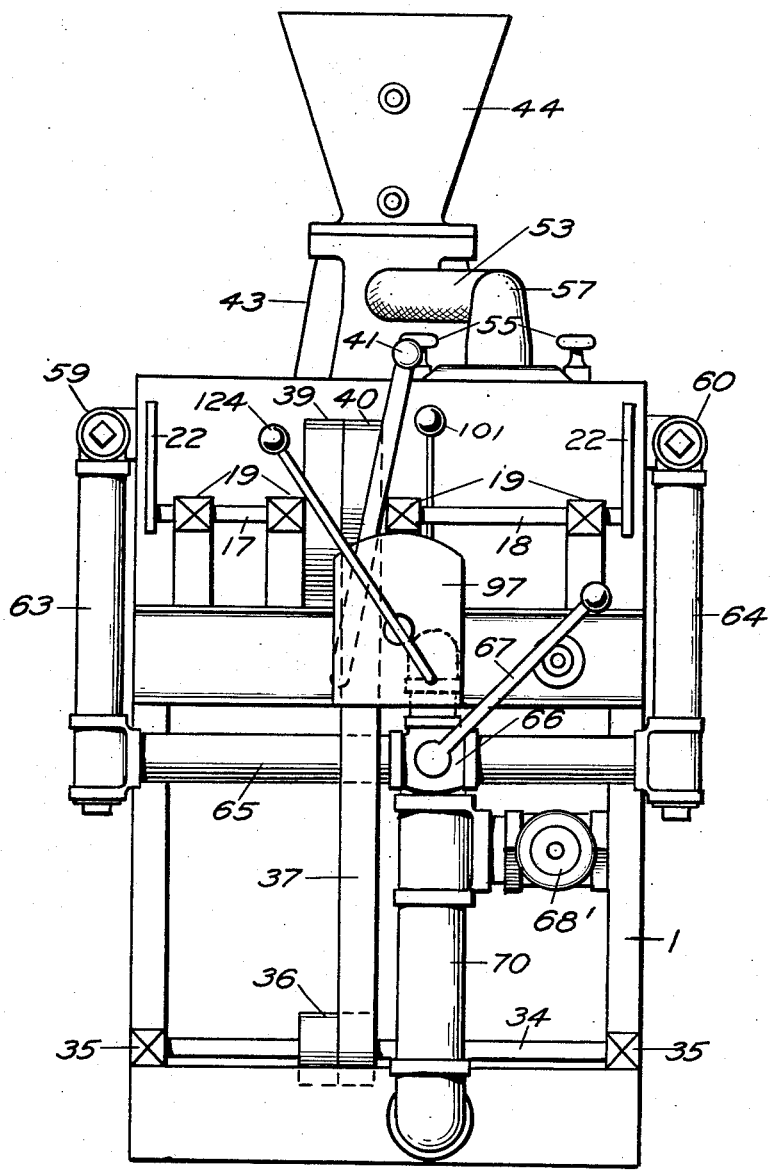
Figure 3 is an end elevation of the impregnating machine.
Figure 4:
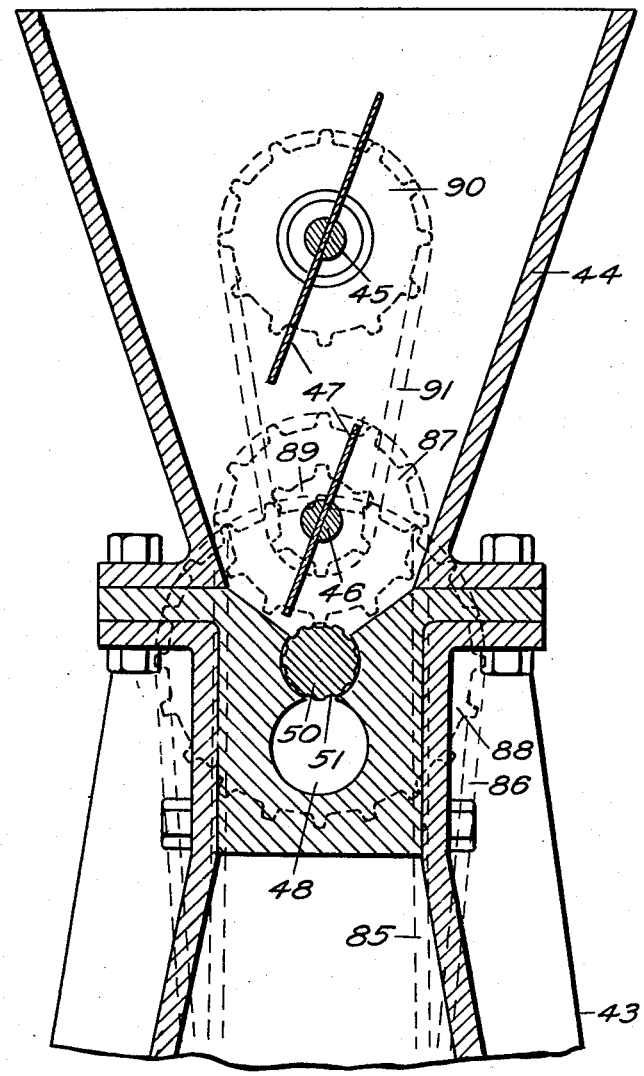
Figure 4 is a longitudinal sectional view showing in detail the feeding unit employed with the impregnating machine.

In Figures 1 through 3, we have shown a machine of the nature described which comprises a suitable supporting frame or bed, generally designated by the reference numeral 1. This frame, which is of rectangular shape, may be formed of structural steel members and is provided with a base and a top, the latter including the side members 2 and end members 3.

On the top of the frame or bed of the machine there is mounted an impregnating box 4 which is divided into compartments or chambers 5 and 6 by a partition 7 extending the full length of the box. The unimpregnated filters 8 which may be of any shape are placed within an impregnating compartment. Hollow threaded members 9 associated with each filter engage internally threaded hollow shafts 10, to thus support the filters, and to provide an air-tight connection with shafts 10. These shafts 10 which extend through the side walls 11 of the impregnating box 4 are mounted for rotation in bearings 12 associated with the box walls. It may be noted that each shaft supports a piece of filter material.

Also mounted within each impregnating compartment are rotatable shafts 13, there being such a shaft provided for each piece of filter material supported for rotation on the shafts 10. The shafts 13 have their ends extending through the side walls 11 of the impregnating box and are supported in bearings 14 and 15 provided on the walls 11 and the partition 7 of the box 4. Secured to each shaft 13, in any suitable manner, is a brush element 16 which is adapted to sweep excess impregnating material from the surface of a piece of filter material 8 on the oscillation of the shaft.

At the left of the machine, as shown in Figures 1 and 2 are two separate compartment mechanism drive shafts 17 and 18 which are carried in bearings 19 supported upon the top of the machine chassis. Each shaft 17 and 18 has a sprocket wheel 20 secured thereto while each filter support shaft 10 has a sprocket 21 keyed or otherwise fastened thereto at a point on the shaft outside the impregnation box wall. The sprockets 21 for the compartment 5 and the sprocket on the shaft 17 are engaged by one of a pair of endless chains 22 while the other chain 22 connects the sprockets 21 of the compartment 6 to the sprocket on the shaft 18. Thus it will be apparent that either set of filter material support shafts may be rotated depending upon which of the driven shafts, 17 or 18, is actuated.

To the end that the brush members or elements 16 may be oscillated upon the rotation of the filter material, each of the driven shafts 17 and 18 are provided with an eccentric 25 which may, as disclosed, be formed integral with a sprocket 20. Connected to each eccentric 25 is a main drive link 26 to which a side drive link 27 is pivotally secured, in any suitable manner, at the point 28. Each side link 27 is provided with a plurality of arms 29, one for each brush shaft 13 of the compartment with which the link is associated. Each of these arms is pivoted to a link 27, in any well known manner, at points 30 and have their lower ends connected to brush carrying shafts 13 as clearly shown in Figure 5. By this construction it will be apparent that rotation of an eccentric, to which a main and side link are connected, will cause the oscillation of the brush shafts engaged by the arms of the side link. Moreover, it may be observed that through the use of two driven shafts simultaneous actuation of the filter support shafts and the brush carrying shafts in either compartment is allowed.

Power for the actuation of the filter support and the brush carrying shafts as well as for the operation of a timing mechanism and feeding device for the impregnating material, the latter to be hereinafter described, is obtained from a main power source such as the electric motor 31. The motor 31 is connected by a belt 32 to a pulley 33 secured to the shaft 34, the latter being carried in bearings 35 supported on the base of the chassis frame. In addition to the pulley 33, there is also secured to the shaft 34 a second pulley 36 which latter, by belting 37 is connected to a pulley 39 or pulley 40 respectively keyed or otherwise secured to the shafts 17 and 18.

As may be noted, the pulleys 39 and 40 are positioned on the adjacent ends of the shafts 17 and 18 so that the belt 37 may be shifted from one pulley to the other for the purpose of allowing operation of the filter support shafts and brush carrying shafts in either impregnating compartment. In order to accomplish this, a lever 41 carrying a shifting finger 42 is suitably pivoted to the frame of the machine so as to rock transversely thereof. By reason of the movement of finger 42, the belt 37 is engaged and shifted onto either the wheel 39 or 40 as desired.

Mounted upon a suitable standard or support 43 at the right end of the machine, as shown in Figure 1, is a hopper 44 in which the impregnating material in a finely divided or pulverized condition, such as lamp black for example, is loaded. The hopper 44 is provided with shafts 45 and 46 supported therein by bearings in the side of the hopper, one end of each shaft extending through a side of the hopper. Each shaft 45 and 46 is provided with paddles 47, which in their rotation agitate the impregnating material within the hopper.

As may be noted, especially well in Figures 1 and 4, the lower end of the hopper is provided with an atomizing chamber 48 just above which is mounted a shaft 49 one end of which also extends through the hopper. Shaft 49 carries a meter unit 50 provided with grooves 51, the length and diameter of the meter unit being such that the portion of the hopper above the meter is substantially closed off from the atomizing chamber 48. It will thus be appreciated that the hopper being loaded with impregnating material, a groove in the meter unit will be filled with this material and on rotation of the meter, the amount of impregnating material carried on the groove will be introduced into the atomizing chamber. Hence it will be apparent that on regulation of the number revolutions of the meter, a predetermined amount of lamp black or other impregnating material will be discharged into the atomizing chamber for impregnation purposes.

Connecting the right end of the chamber 48 with a source of air under pressure is a pipe or conduit 52 while the left end of the chamber is connected to a flexible conduit 53. The supply of air entering the chamber 48 is controlled by a valve 54a having an elongated handle 59 which extends lengthwise of the machine to the left end thereof. This valve rod or handle is supported from the machine frame in any conventional manner. When in operation, air flowing under pressure through the pipe 52 enters the chamber 48 and blows the lamp black from the grooves 51 of the meter mechanism which are in the chamber, as well as any lamp black which may have been deposited within the chamber, into the flexible conduit 53.

As already pointed out, the impregnating box 4 is provided with two chambers 5 and 6, one or the other being employed for an impregnation. To accomplish this, the box 4 is provided with a close fitting air tight top 54 of a width sufficient to cover a chamber. This cover is slidably mounted in the ends of the impregnating box by any suitable means providing air tight joints so that either chamber desired may be covered and sealed from the atmosphere of the room or place where the machine is operated. For the purpose of moving the cover it is provided with handles or grips 55. Cover 54 is so constructed as to have a hollow interior and hence provide a manifold 56 of a width and length substantially equal to that of the cover. An elbow 57 is secured to or formed on the upper surface of the cover so that communication between the conduit 53 which is secured thereto and the manifold 56, may be obtained. By reason of slots 58, formed in the lower surface of the impregnating compartment, entrance into the compartment covered is effected. The slots 58, it should be observed, are positioned directly over the centers of the filters 8 so that the air stream containing the lamp black strikes the surface of the filters, forcing the particles of lamp black into the pores of the filter material.

It will also be noted that as each filter rotates there is only a slight clearance between it and the inner surface of the manifold in order that the air stream carrying the lamp black will impinge directly and forcibly upon the filter to force the lamp black into the pores thereof.

From the description of our invention as already given, it may be observed that on actuation of the meter unit, lamp black or other impregnating material will be blown through the conduit into an impregnating compartment top and from thence into either impregnating compartment, depending on which compartment is closed. Through the rotation of the filter material, undergoing impregnation, a uniform distribution of the impregnating material is obtained over the surface thereof and into the pores thereof while the oscillation of the brush carrying shafts prevents the accumulation of excess impregnating material on each filter.

Figure 5:
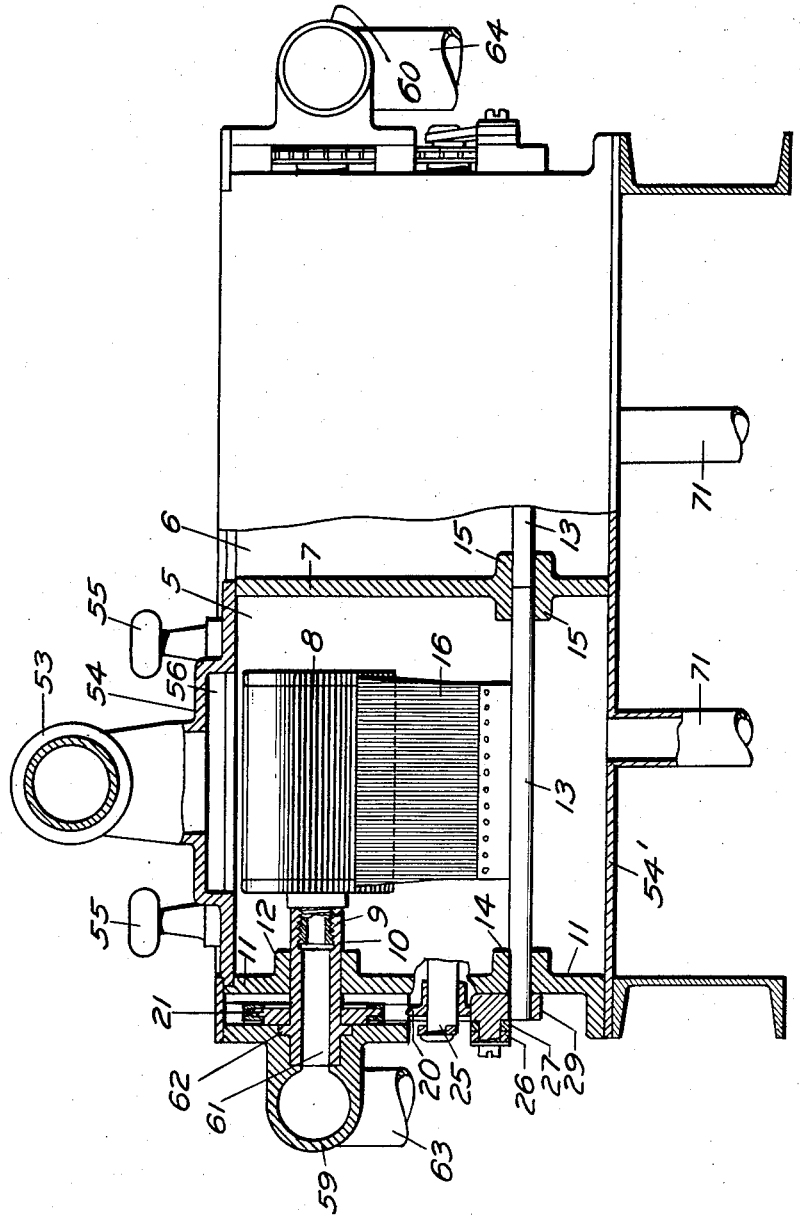
Figure 5 is a part transfer sectional and part rear view, showing in detail the impregnation box of the device.

It is desirable to evacuate air from within the filters being treated and it is for this purpose that the filter support shafts 10 are hollow so that communication with the interior of a compartment and a manifold connected to a vacuum pump may be obtained. Particularly well shown in Figures 2 and 5 are manifolds 59 and 60 secured to each side of the impregnating box 4. By means of conduits 61, each shaft 10 is placed in communication with its corresponding manifold. To be noted is the fact that a close fit between the end of each shaft 10 and a conduit 61 is made. In addition to this, near the outer end of each shaft 10 a flange 62 is provided which rotates in a depression in the inner surface of the manifold. If desired, packing may be placed around each shaft 10 where it enters a manifold.

Manifolds 59 and 60 are respectively connected by pipes or conduits 63 and 64 to a pipe 65 in which is a three-way valve 66 actuated by a valve handle or lever 67. Connecting valve 66 with a valve 68 which is closed and opened by the valve handle 68' is a conduit 69. Valve 68, through means of a pipe 70, is in direct communication with a vacuum or suction pump (not shown) of any suitable capacity and design. From the piping system outlined, it may be observed that the amount of the exhaust may be controlled by the valve 68 while the three-way valve 66 allows either impregnating compartment to be exhausted. This piping system in combination with the hollow filter support shafts and the hollow clutch members, allows air to be sucked through and from within the filter material being treated so as to increase the penetration of the particles of impregnating material and hence the efficiency of the filter itself.

In addition to the vacuum pump system described, each impregnating chamber is connected by means of a conduit 71, entering the chamber through an opening in its floor 54' (see Figure 5), to the intake of a suction blower 72 which is driven by an electric motor 73. Blower 72 is provided with an exhaust line 74 leading to any desired location. By this expedient excess lamp black or other impregnating material which settles in the impregnating compartments is removed and saved for further use.

If desired, both impregnating compartments may be connected to a single blower, or a separate blower can be employed for each compartment. The former construction may be effected by providing the intake pipe of the blower with two branches. Suitable valves may be placed in each branch for shutting off either compartment or a three-way valve at the junction of the branches may be used.

As already mentioned, the electric motor 31 is employed to actuate the feeding mechanism within the hopper 44 as well as a timing device which determines the length of operation of the meter unit 50. For this purpose, the shaft 34 is provided with a suitable pulley which is connected by means of belting 75 to a pulley 76 carried on a shaft 77 supported from the under surface of the top of the machine frame. The shaft 77 in addition has keyed thereto a bevel gear 78 which meshes with a bevel gear 79 on one end of a shaft 80, the other end of the shaft being provided with a sliding clutch or coupling member 81. Coupling 81 is adapted to be engaged by a male coupling member 82 keyed or otherwise fixed to a shaft 83. As may be observed, shafts 80 and 83 are carried in suitable bearings 84 which are suspended from the top of the machine frame in any conventional manner.

Near its right end as viewed in Figure 1, shaft 83 is provided with two sprockets which are respectively connected by means of chains 85 and 86 to a sprocket 87 carried on the paddle shaft 46 and a sprocket 88 carried on the meter unit shaft 49. Besides the sprocket 87, shaft 46 has keyed thereto a second sprocket 89 which is engaged to a sprocket 90, carried on the paddle shaft 45 by the chain 91. Through this construction it will be observed that on engagement of the coupling member 82 with the coupling member 81 and on actuation of the power source 31, rotation of the meter unit and the feeding device for the impregnating material will be accomplished.

From the foregoing description, it will be appreciated that the operation of the moving parts of the machine are effected by reason of the prime mover of electric motor 31. It is hence necessary to provide means for starting the motor and for arresting its actuation. The motor 31 through a suitable wiring system is connected to a switch 92 supported from cross piece 95 of the chassis. This switch which is of the push button type, has the starting button thereof depressed by movement of switch finger 93 pivoted at 94 on cross piece 95. Below the pivot, the switch finger is secured to a rod 96 which is slidably supported, in any conventional manner, from the chassis top. Rod 96 is of a length sufficient to extend to the left end of the machine and over a bracket member or control mounting plate 97 secured to the left end of the machine.

Figure 7:
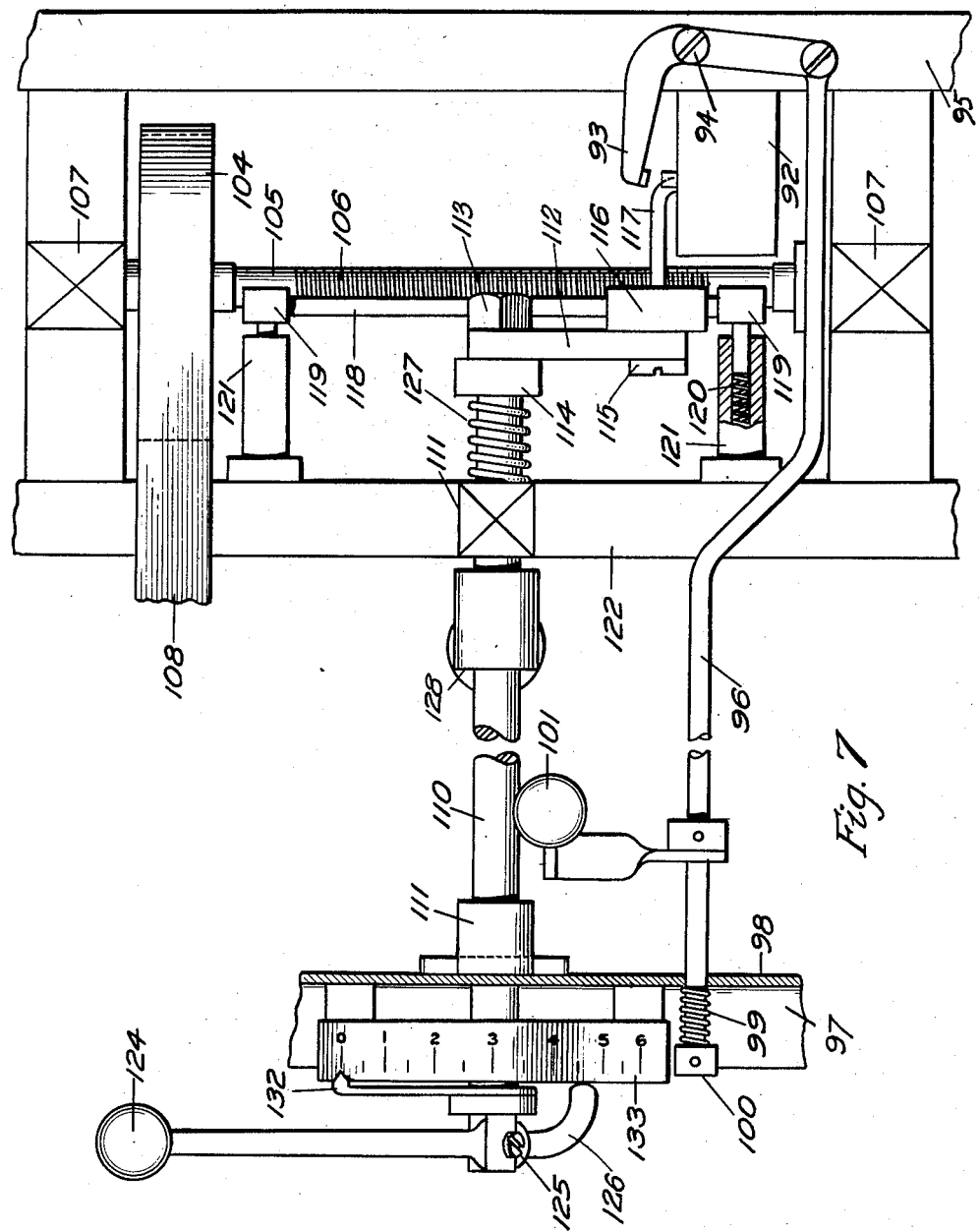
Figure 7 is a detail top plan view of the timing mechanism.

This plate, as may be noted, at its side adjacent the machine frame, is provided with a flange 98 so that one end of a spring 99 carried on the left end of the rod 96 will be in bearing relation therewith. At the left end of the shaft 96 a suitable block or retaining member 100 is secured so that a construction allowing the spring 99 to be positioned between the flange 98 and the block is afforded. Thus it will be appreciated that on movement of the rod 96 to the right end of the machine which causes the finger 93 to contact with the switch button and depress the same, will also compress the spring 99 between the flange 98 and the block 100, the spring being loosely mounted on the rod 96. Upon release of the rod 96, after it has been moved to the right, the energy of the spring 99 will cause it to return to the left or the position shown in Figure 7.

Movement of the rod 96, in a manner such as that just described, is effected by a lever 101 pivoted at 102 to a bracket or standard 103 carried on the top of the machine. As may be noted from Figure 7, the lower end of the lever 101 is secured or fastened to the switch rod 96 by any means, such for example as a screw or pin.

To arrest the actuation of the feeding mechanism and meter unit after predetermined time of operation, as well as the actuation of the motor 31, a timer wheel or pulley 104 fixed on a rotatable timer shaft 105 is employed. The shaft 105 which is threaded, as at 106, for part of its length is positioned at right angles to the shaft 83, being supported in bearings 107 secured to the top of the machine chassis. Driving of the timer shaft is accomplished through the use of a belt 108 running over the timer pulley and a pulley 109 on the shaft 77.

Associated with the timer wheel and forming a part of the timing mechanism is a rod 110 slidably and rotatably mounted within bearings 111 carried on the machine top. This shaft, as may be noted, is of a sufficient length to extend from a point near the timer shaft 105 to the left end of the machine so that the left end of the shaft extends through and beyond the control mounting plate 97. An arm 112 is secured to the end of the rod 110 adjacent the timer shaft. Timer arm 112 is held in fixed relation to the timer rod so as to rotate therewith by any suitable means, as for example the bolt 113 holding the arm in fixed position against a block or enlarged portion 114 on the timer control rod.

At its lower end, arm 112 has fixed thereto by a cap screw 115, a half nut 116 which is adapted to be engaged by the threads on the timer shaft and hence to be moved on the rotation of the latter. Half nut 116 carries a finger 117, which is employed to depress the stop button of the switch 92 so as to arrest the operation of the main power unit 31.

To provide a guide for the half nut, it is mounted to slide on two support shafts 118, the end of each support shaft being mounted in a slidable carriage member or piston 119 which may be moved against the action of a spring 120 in a cylinder 121 carried on a cross piece 122 of the chassis. Thus it will be appreciated that engagement or disengagement of the half nut by movement of the timer control rod 110 lengthwise of its axis will be allowed while rotation of the time shaft 105 will cause the movement of the half nut while engaged therewith, which latter is guided by the tracks or slides 118.

Inasmuch as the timer control rod and its arm 112, are rotated when the half nut is engaged with the timer shaft, the opening 123 in the timer arm, through which cap screw 115 passes, is in the form of an elongated slot. This construction expedient allows compensation for the linear movement of the half nut and prevents binding of the parts of the timer mechanism.

Figure 6:
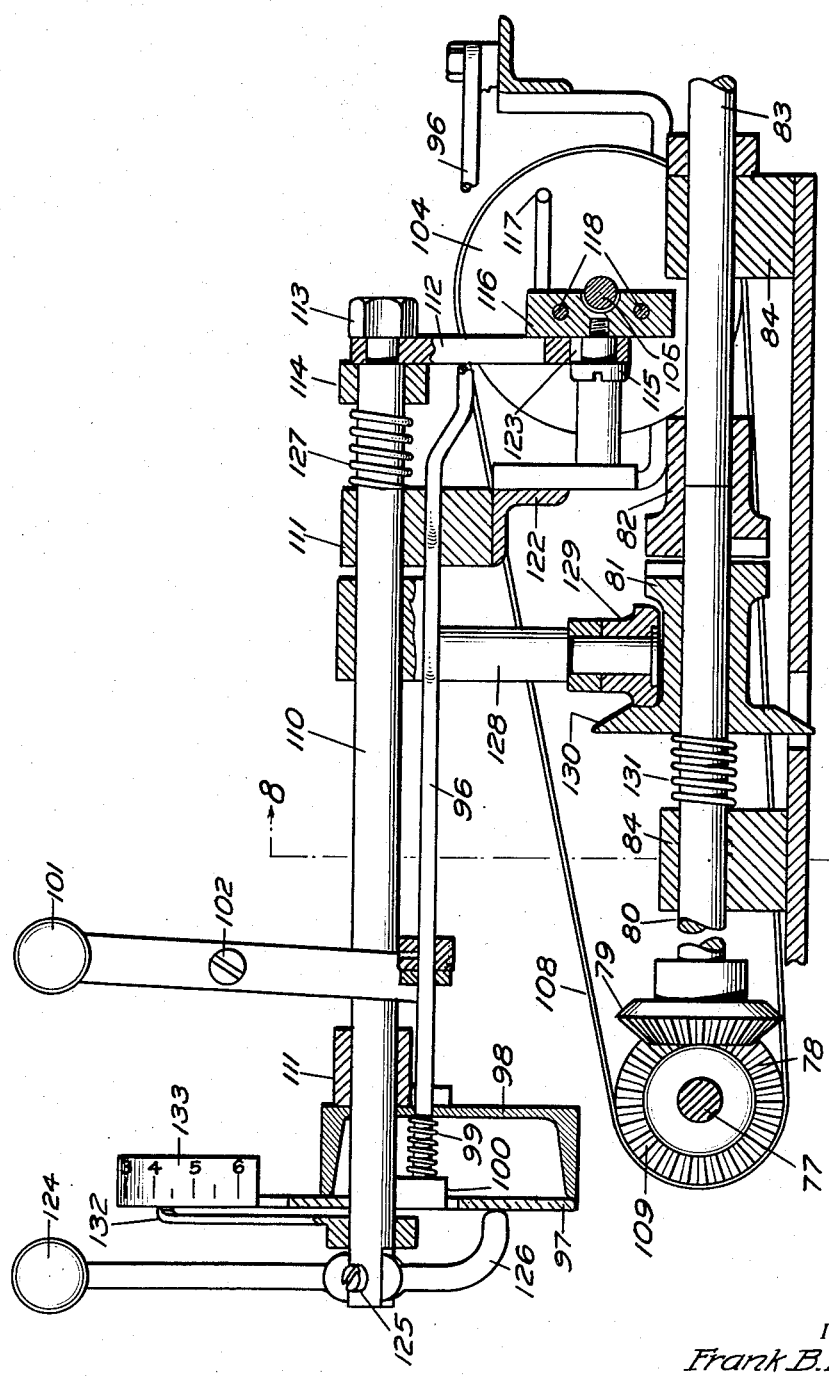
Figure 6 is a longitudinal sectional view of the timing mechanism.

Longitudinal and rotative movement of the timer rod 110, for the purpose of setting the half nut at any desired position on the threads of the time shaft is effected by means of a lever 124 pivoted at 125 to the end of the timer rod which extends through the control support bracket. This lever is provided with a curved foot portion 126 which bears against the face of the mounting plate 47 so that when the lever is moved to the left, as shown in Figure 6, the shaft 110 and arm 112 will be moved in a similar direction, thus freeing the half nut from engagement with the timer shaft. By means of a spring 127, mounted on the timer rod between a bearing 111 and block member 114, the rod 110 is normally maintained in a position such that the half nut is engaged with the timer shaft.

The timing mechanism, so far described, is employed for the purpose of stopping the entire machine. To the end that the feeding mechanism and meter unit may be separately arrested while the filter support shafts and the brush carrying shafts are still being actuated an arm 128 provided with a foot or shoe 129 is fixed to the timer rod to rotate therewith. When the half nut is engaged with the timer shaft, it will be appreciated that the timer rod will be rotated on movement of the timer nut.

Such rotation will, of course, cause the arcuate movement of the meter control arm 128. It should be noted that the movable coupling member 81 on the shaft 80 is provided with an enlarged end 130 which possesses the shape of a truncated cone. As the control arm 128 rotates the shoe thereof engages the conical end 130 of the coupling member 81 and moves it towards the left on its shaft against a spring 131, the latter being positioned between the end of the coupling member and a bearing 84. This movement of the coupling member causes it to be disengaged from the shaft 83 so that rotation of the latter with resultant actuation of the meter unit is prevented.

Figure 8:
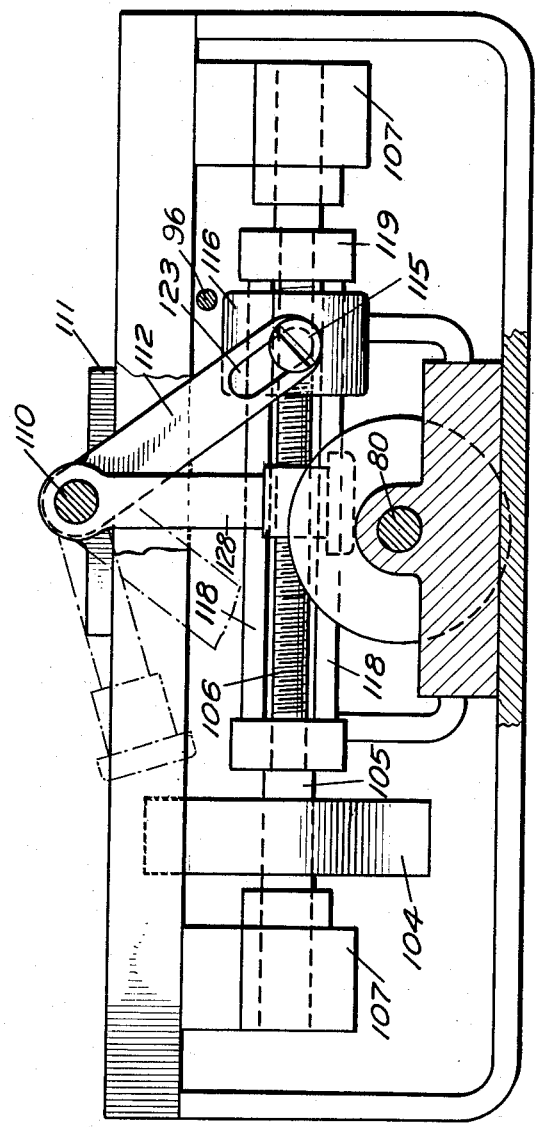
Figure 8 is a sectional view of the timing mechanism taken along the line 8—8 shown in Figure 6.

For the purpose of best disclosing the movement of arms 112 and 128 we have shown in Figure 8 their positions at the opposite extremities of their respective paths of travel, their initial positions being indicated by the dotted lines. Obviously, by suitable rotation of rod 110 which may be accomplished by operation of control lever 124 the coupling member 81 is freed from its engagement with the control arm 128 so that the spring 131 will force the coupling member to its normal position of engagement with its cooperating coupling member 82 on shaft 83.

In order to determine the time of impregnation, the timer rod 110 is provided with a pointer 132, fixed thereto in any conventional manner, which passes across a scale on an arc 133 carried on the control mounting plate. The arc 133 is so graduated that units of distance thereon are calibrated into units of time of impregnation. Thus in setting the machine for any desired time of impregnation, the lever 124 is swung to the left and rotated until pointer 132 is opposite the desired point of the scale 133. After this the lever or handle 124 is released so that the half nut engages the timing shaft. By this means a predetermined degree of impregnation is obtained.

In the operation of our machine, the hopper 44 is charged with the impregnating material to be employed. After this, the unimpregnated filters are mounted by being screwed into the threaded hollow support shafts 10 of an impregnating compartment. One compartment of the impregnating box having been so loaded, the cover therefor is moved over the same so as to tightly close it. Control valve 54 is then opened so as to allow air under pressure to flow through the chamber 48 and into the impregnating box. At the same time operation of the vacuum pump connecting with the hollow filter material support shafts is begun, the three-way valve 67 having been first positioned so that the compartment being employed for the treatment of the filter material is in communication with the vacuum pump. As previously noted, the suction exhaust through the manifolds connecting to the filter support shafts is controlled by means of the valve 68 which valve is set as desired. Also, actuation of the blower 72 connecting with the compartment in use is commenced.

Having completed these operations and determined the degree of impregnation desired, the timing mechanism lever 124 is moved so as to free the half nut 116 from engagement with the timer shaft and is rotated so as to set the pointer at the scale marking desired. After this lever 124 is released, causing engagement of the half nut with the timer shaft.

In addition to these operations, belt shifting lever 41 is so moved that belt 37 is connected to the compartment mechanism drive wheel of the compartment in use. The device is now ready for impregnation of the filters and to this end switch button control lever 101 is operated in a manner to cause the finger 93 to depress the starter button on the switch, which causes the actuation of the motor 31 and the parts of the machine which the motor drives.

As already noted, by means of the sprockets on the hollow filter support shafts and on either the shaft 17 or 18, the filters within the compartment employed are rotated while oscillation of the brush carrying shafts occurs by reason of their linkage connection to the compartment mechanism drive shaft. At the same time shafts 80 and 83 are rotated which by reason of the belting and chains and sprockets employed, causes the rotation of the paddles 47 and the meter unit 51, allowing the latter to carry impregnating material into the chamber 48 where it is blown from the grooves in the meter through pipe 53 into the impregnating compartment.

Rotation of the unimpregnated filters, it will be appreciated, allows the air current to contact with their entire surface thus insuring impregnation of all parts of the filters. At the same time the action of the brushes sweeps excess impregnating material from the filter surfaces so as to permit a better penetration of the impregnant into the filter material.

As already mentioned, air is evacuated from within the filter material through the use of a suction pump connected to the hollow filter material support shafts. The suction created by this pump materially aids in drawing the finely divided particles of impregnating material into the pores of the filter material undergoing treatment while the rotation of the filter material insures impregnation of all the parts of the filter material undergoing treatment. By use of the brushes 16, excess impregnating material on the filters is removel and deposited in the bottom of the impregnating compartment from whence it is recovered by means of the suction blower 72 discharging through the exhaust line 74.

During the operation of the machine as described, the half nut 116 engaged with the timer shaft is being constantly moved outwardly, that is in a direction towards the side of the machine disclosed in Figure 1. Because of its connection with the half nut and with the timer rod 110, the half nut connecting arm 112 causes the rotation of the timer rod 110 as the half nut is moved along the timer shaft. This rotation effects the movement of the meter control arm 128 so that its shoe 129 is moving the coupling member 81 out of engagement with its cooperating member 82. When such disengagement is completely made, rotation of the shaft 83 and operation of the meter and feeding device ceases, thus determining the amount of impregnating material discharged into the chamber 48 in the hopper 44.

After operation of the meter and feeding device has ceased, the timer shaft is still being rotated with the result that the half nut moving along the shaft finally reaches such a position that the switch button is depressed so that the motor 31 is stopped.

During the impregnation taking place in the compartment being employed, the other compartment is undergoing loading in a manner like that previously described. When the filters first being treated are impregnated and operations within that compartment ceased, the top 54 is moved so as to cover the compartment with the undertreated filter material therein. Operations for the actuation of the devices within the compartment containing the untreated filter material of a nature similar to those just described are then gone through, such changes as are necessary being made in the positioning of the control valves and the compartment mechanism drive belt.

We have found that our machine works successfully when impregnating porous filter material with any finely divided or pulverized substance. Preferably, because of the efficient filters it produces, lamp black is employed as the impregnating material. However, our invention is in no ways limited to this particular impregnation substance, as the impregnating compound or mixture employed will not effect the functioning and the efficiency of our machine.

While we have disclosed various forms of driving means for this mechanism of our invention, it is to be understood that other and different types of driving connections, including belts, chains, shafts, gears, clutches, couplings, or any combination of these may be employed without departing from the spirit of the invention or the scope of the appended claims. Likewise, it will be appreciated that the various mechanisms may be driven by any suitable source of power and are not limited to actuation by electric motors as shown.

In addition, it will be appreciated that if desired, the speed of rotation of the meter unit, timer shaft, and the rotating and oscillating mechanism within each compartment, may be varied as desired, through the use of gears or pulleys with different diameters. For example, by such practice the speed of the meter unit which will effect the quantity of impregnating material introduced into the mixing chamber may be accelerated or decreased.

Although, we have shown a machine having an impregnating box provided with only two compartments, it will be appreciated that any number of impregnating boxes may be placed on one machine bed. Through suitable structural changes, an impregnating box containing three or more compartments may be employed.

From the foregoing description it will be appreciated that we have designed a novel and efficient machine for impregnating filter material with a finely divided or pulverized substance, such for example as lamp black. Moreover, a machine in which the entire surface of a filter may be subjected to impregnation, as well as a device for insuring a uniform degree of impregnation of a plurality of filters has been provided. It should also be noted that the machine described is of simple and easy operation and may be continuously actuated so as to impregnate one of a plurality of sets of untreated filters.

While we have shown and described the preferred embodiment of our invention, we wish it to be understood that we do not confine ourselves to the precise details of construction herein set forth by way of illustration, as it is apparent that many changes and variations may be made therein by those skilled in the art, without departing from the spirit of the invention, or exceeding the scope of the appended claims.

We claim—

1. A filter impregnating machine comprising a frame, an impregnating box containing a compartment mounted therein, means in said compartment for rotatably mounting filters undergoing treatment, means for rotating said filters, and means for introducing a gas containing finely divided particles of impregnating material into said compartment of said box.

2. A filter impregnating machine comprising a frame supporting an impregnating box containing a compartment, means in said compartment for rotatably mounting filters undergoing treatment, means for closing said compartment containing filters being impregnated from the remainder of said box, means for rotating said filters, and means for introducing a gas containing finely divided particles of impregnating material into the closed compartment.

3. A filter impregnating machine comprising a frame supporting an impregnating box containing a compartment, means for rotatably mounting a plurality of filters in said compartment, means for rotating the filters in said compartment, means for introducing a gas containing finely divided particles of impregnating material into the compartment containing filters undergoing treatment, and means for brushing excess impregnating material from the filters while undergoing treatment.

4. A machine for impregnating filters comprising a frame supporting an impregnating compartment, means in said compartment for rotatably mounting a plurality of filters, means for closing a compartment containing filters undergoing impregnation, means for introducing a gas containing finely divided particles of impregnating material into the closed compartment, and a brush mechanism associated with each filter for removing excess impregnating material therefrom during impregnation.

5. A filter impregnating machine comprising a frame supporting a compartment having a plurality of hollow shafts rotatably mounted therein, means for mounting a filter on each shaft, means connecting each of said hollow shafts to a suction pump, means for rotating each of said shafts, and means for introducing a gas containing finely divided particles of impregnating material into said compartment.

6. An impregnating machine comprising a frame supporting an impregnating compartment having a plurality of hollow shafts rotatably mounted therein, means for supporting a filter from each of said shafts, means for closing said compartment containing filters being impregnated, means for introducing finely divided particles of impregnating material into the closed compartment while rotating the filters therein, and means for exhausting the air from within the filters in the closed compartment being rotated while undergoing treatment.

7. A filter impregnating machine comprising a frame supporting a compartment having a plurality of hollow shafts rotatably mounted therein, means for mounting a filter on each shaft, means connecting each of said hollow shafts to a suction pump, means for rotating each of said shafts, means for introducing a gas containing finely divided particles of impregnating material into said compartment and a brush mechanism for removing excess impregnating material from the surface of the filters undergoing impregnation.

8. An impregnating machine comprising a frame supporting an impregnating compartment having a plurality of hollow shafts rotatably mounted therein, means for supporting a filter from each of said shafts, means for closing a compartment containing filters being impregnated, means for introducing finely divided particles of impregnating material into close compartment while rotating the filters therein, means for exhausting the air from within the filters being rotated in the closed compartment while undergoing treatment, and means for removing excess impregnating material from the surface of the filters being impregnated in the closed compartment.

9. An impregnating machine comprising a frame supporting an impregnating compartment having a plurality of hollow shafts rotatably mounted therein, means for supporting a filter from each of said shafts, means for rotating each of said shafts, means for introducing a gas carrying particles of impregnating material into said compartment, suction means for removing from said compartment excess impregnating material deposited therein and means for evacuating air from within the filters undergoing impregnation associated with each hollow shaft.

10. A filter impregnating machine comprising a frame supporting a compartment, a plurality of hollow shafts rotatably mounted within said compartment, means for supporting a filter from each shaft, means for closing the compartment containing filters being impregnated, means for introducing a gas containing finely divided particles of impregnating material into the closed compartment, means for rotating the filter support shafts in the closed compartment, other means associated with each hollow filter support shaft for evacuating air from within the filter supported thereon in the closed compartment, and suction means for removing from the closed compartment excess impregnating material deposited therein.

11. An impregnating machine comprising a frame supporting an impregnating compartment having a plurality of hollow shafts rotatably mounted therein, means for supporting a filter from each of said shafts, means for rotating each of said shafts, means for introducing a gas carrying particles of impregnating material into said compartment, a brush mechanism associated with each filter support shaft for sweeping off excess impregnating material on the surface of the filter supported thereon, suction means for removing from each compartment excess impregnating material deposited therein and means associated with each hollow shaft for evacuating air from within the filters undergoing impregnation.

12. A filter impregnating machine comprising a frame supporting a compartment, a plurality of hollow shafts rotatably mounted within said compartment, means for supporting a filter on each shaft, a brush mechanism for sweeping the surface of said filter mounted within said compartment for each filter support shaft, means for closing a compartment containing filters being impregnated, means for introducing a gas containing finely divided particles of impregnating material into the closed compartment, driven means for rotating the filter support shafts with their filters and for actuating the brush mechanism within the closed compartment, means communicating with the hollow shafts of the closed compartment for evacuating air from the filters therein, and suction means for removing excess impregnating material deposited within the closed compartment.

13. A filter impregnating machine comprising a frame, a plurality of compartments for holding filters for impregnation, a conduit connecting with a gas under pressure, means communicating with said conduit for introducing therein a predetermined amount of a finely divided impregnating material, and selective means for connecting said conduit with any compartment.

14. A filter impregnating machine comprising a frame, a compartment for holding filters undergoing impregnation, means associated with said compartment for rotatively mounting said filters, a power source for actuating the same connected to said rotative filter mounting means, a conduit connecting said compartment with a gas under pressure and means communicating with said conduit for introducing therein a predetermined amount of a finely divided impregnating material.

15. A filter impregnating machine comprising a frame, a compartment for holding filters undergoing impregnation, a closure for said compartment, a hopper for containing finely divided impregnating material mounted on said frame, said hopper being provided with a chamber at its lower end closed off from the remainder of the hopper by a rotatively mounted meter roller, said roller being provided with a plurality of grooves on its surface, a conduit connecting said chamber with a gas under pressure, a second conduit connecting said chamber with said compartment and means for revolving said meter a predetermined time at a fixed speed.

16. A filter impregnating machine comprising a frame, a compartment for holding filters undergoing impregnation, means associated with said compartment for rotatively mounting said filters, a power source for actuating the same connected to said rotative filter mounting means, a hopper for containing finely divided impregnating material mounted on said frame, said hopper being provided with a chamber at its lower end, conduits connecting said chamber with a gas supply under pressure and with said compartment, a rotatively mounted meter roller in said hopper for introducing impregnating material into said chamber, means affording a detachable driving connection between said power source and said roller, and means actuated by said power source for breaking said driving connection after a predetermined time of operation to arrest the actuation of said meter unit.

17. A filter impregnating machine comprising a frame, a compartment for holding filters undergoing impregnation, means associated with said compartment for rotatively mounting said filters, a power source for actuating the same connected to said rotative filter mounting means, a hopper for containing finely divided impregnating material mounted on said frame, said hopper being provided with a chamber at its lower end, conduits connecting said chamber with a gas supply under pressure and with said compartment, a rotatively mounted meter in said hopper, said meter being driven by said power source through a detachable driving connection therewith, a timer shaft driven by said power source, means actuated by said timer shaft for breaking the driving connection between the power source and the meter after a predetermined time of operation and other means actuated by said timer shaft for arresting the operation of the power source.

18. A filter impregnating machine comprising a frame supporting an impregnating compartment, a plurality of shafts rotatively mounted within said compartment, means for supporting a filter on each shaft, means for introducing a gas under pressure carrying finely divided particles of impregnating material into said compartment, a power source for rotating said filter support shafts, an electric switch mechanism for controlling the actuation of said power source, means carried by said frame for operating said switch so as to start said power source and means driven by said power source for operating said switch so as to arrest the actuation of said power source.

19. A filter impregnating machine comprising a frame supporting an impregnating compartment, a plurality of shafts rotatively mounted within said compartment, means for supporting a filter on each shaft, means for introducing a gas under pressure carrying finely divided particles of impregnating material into said compartment, a power source for rotating said filter support shafts, an electric switch mechanism for controlling the actuation of said power source, a timer shaft provided with threads driven by said power source, a half nut engaging said shaft, said half nut being mounted for movement lengthwise of said shaft, and means carried by said half nut for operating said switch so as to arrest the actuation of said power source.

20. A filter impregnating machine comprising a frame supporting an impregnating compartment, a plurality of shafts rotatively mounted within said compartment, means for supporting a filter on each shaft, means for introducing a gas under pressure carrying finely divided particles of impregnating material into said compartment, a power source for rotating said filter support shafts, an electric switch mechanism for controlling the actuation of said power source, a timer shaft provided with threads driven by said power source, a half nut engaging said shaft, said half nut being mounted for movement lengthwise of said shaft, movable means supporting said half nut for freeing it from engagement with said timer shaft, and a finger on said half nut for operating said switch to arrest the actuation of said power source.

21. A filter impregnating machine comprising a frame supporting an impregnating compartment, a plurality of shafts rotatively mounted within said compartment, means for supporting a filter on each shaft, means for introducing a gas under pressure carrying finely divided particles of impregnating material into said compartment, a power source for rotating said filter support shafts, an electric switch mechanism for controlling the actuation of said power source, a timer shaft provided with threads driven by said power source, a half nut engaging said shaft, said half nut being mounted for movement lengthwise of said shaft, movable and rotatable means supporting said half nut for freeing it from the timer shaft and engaging it with the timer shaft at any point desired on the threaded portion thereof, and a finger on said half nut for operating said switch so as to arrest the actuation of said power source.

22. A filter impregnating machine comprising a frame supporting an impregnating compartment, a plurality of shafts rotatively mounted within said compartment, means for supporting a filter on each shaft, means for introducing a gas under pressure carrying finely divided particles of impregnating material into said compartment, a power source for rotating said filter support shafts, an electric switch mechanism for controlling the actuation of said power source, a timer shaft provided with threads driven by said power source, a half nut engaging said shaft, said half nut being mounted for movement lengthwise of said shaft, movable and rotatable means supporting said half nut for freeing it from the timer shaft and engaging it with the timer shaft at any point desired on the threaded portion thereof, said rotatable and movable supporting means for the half nut having other means associated therewith for determining the degree of rotation of said support, and a finger on said half nut for operating said switch to arrest the actuation of said power source.

23. A filter impregnating machine comprising a frame supporting an impregnating compartment, a plurality of shafts rotatively mounted within said compartment, means for supporting a filter on each of said shafts, a hopper for containing impregnating material, said hopper being provided with a chamber and a rotatable meter for introducing impregnating material into said chamber, conduits connecting said chamber to a supply of gas under pressure and to said compartment, a power source for rotating said filter support shafts, a shaft driven by said power source coupled to said meter by a detachable coupling member, a threaded timer shaft also driven by said power source, a half nut normally engaging said timer shaft, said half nut being mounted for movement lengthwise of said timer shaft, means connecting said half nut with a timer control rod so as to rotate the latter, and means carried on said timer control rod for freeing said coupling member to arrest the actuation of the meter after a predetermined time of operation.

24. A filter impregnating machine comprising a frame supporting an impregnating compartment for holding filters undergoing treatment, a plurality of shafts rotatively mounted within said compartment, means for supporting a filter on each of said shafts, a hopper for containing impregnating material, said hopper being provided with a chamber and a rotatable meter for introducing impregnating material therein, conduits connecting said chamber to a supply of gas under pressure and to said compartment, a power source for rotating said filter support shafts, a shaft driven by said power source coupled to said meter by a detachable coupling member, a threaded timer shaft also driven by said power source, a half nut normally engaging said timer shaft, said half nut being mounted for movement lengthwise of said timer shaft and for movement away from said shaft, means connecting said half nut to a movable and rotatable timer control rod so as to rotate the latter, means on said timer control rod for freeing said coupling member to arrest the actuation of the meter mechanism, and means associated with the timer rod for moving and independently rotating the same.

25. A filter impregnating machine comprising a frame supporting an impregnating compartment for holding filters undergoing treatment, a plurality of shafts rotatively mounted within said compartment, means for supporting a filter on each of said shafts, a hopper for containing impregnating material provided with a chamber and a meter for introducing impregnating material into said chamber, conduits connecting said chamber to a supply of gas under pressure and to said compartment, a power source for rotating said filter support shafts, a shaft driven by said power source coupled to said meter by a detachable coupling member, a threaded timer shaft also driven by said power source, a half nut normally engaging said timer shaft, said half nut being mounted for movement lengthwise of said timer shaft and for movement away from said shaft, means connecting said half nut to a movable and rotatable timer control rod so as to cause said rod to rotate, means on said timer rod for freeing said coupling member to arrest the actuation of the meter, means associated with the timer rod for moving and independently rotating the same, and other means associated with said timer rod for determining the degree of rotation given thereto by said independent rotating means.

26. A filter impregnating machine comprising a frame supporting an impregnating compartment for holding filters undergoing treatment, a plurality of shafts rotatively mounted within said compartment, means for supporting a filter on each of said shafts, a hopper for containing impregnating material provided with a chamber and a meter for introducing impregnating material into said chamber, conduits connecting said chamber to a supply of gas under pressure and to said compartment, a power source for rotating said filter support shafts and a shaft coupled to said meter mechanism by a detachable coupling member, a threaded timer shaft also driven by said power source, an electric switch mechanism for controlling the actuation of said power source, a half nut normally engaging said timer shaft, said half nut being mounted for movement lengthwise of said timer shaft and for movement away from said shaft, means connecting said half nut to a movable and rotatable timer control rod so as to cause said rod to rotate, means on said timer control rod for freeing said coupling member to arrest the actuation of the meter, means associated with the timer rod for moving and independently rotating the same, and a finger on said half nut for operating said switch so as to arrest the actuation of said power source.

27. A filter impregnating machine comprising a frame supporting an impregnating compartment for holding filters undergoing treatment, a plurality of shafts rotatively mounted within said compartment, means for supporting a filter on each of said shafts, a hopper for containing impregnating material being provided with a chamber and a meter for introducing impregnating material into said chamber, conduits connecting said chamber to a supply of gas under pressure and to said compartment, a power source for rotating said filter support shafts and a shaft coupled to said meter by a detachable coupling member, a threaded timer shaft also driven by said power source, an electric switch mechanism for controlling the actuation of said power source, a half nut normally engaging said timer shaft, said half nut being mounted for movement lengthwise of said timer shaft and for movement away from said shaft, means connecting said half nut to a movable and rotatable timer control rod so as to cause the rotation of said rod, means on said timer control rod for freeing said coupling member to arrest the actuation of the meter mechanism after a predetermined time of operation, means associated with the timer rod for moving and independently rotating the same, other means associated with said timer rod for determining the degree of rotation given thereto by said independent rotating means, and a finger on said half nut for operating said switch so as to arrest the actuation of said power source.

28. A filter impregnating machine comprising a frame supporting an impregnating compartment for filters undergoing treatment, a plurality of shafts rotatably mounted in said compartment for supporting filters thereon, a hopper for containing impregnating material provided with a meter mechanism for introducing impregnating material into a conduit leading into said compartment, a power source, an electric switch mechanism for controlling the actuation of said power source, means connecting said power source to said filter support shafts, other means connecting said power source to said meter mechanism, and still other means driven by said power source for arresting the actuation of the meter mechanism after a predetermined time and subsequently arresting the actuation of the power source.

29. A filter impregnating machine comprising a frame supporting an impregnating compartment for filters undergoing treatment, a plurality of shafts rotatably mounted in said compartment for supporting filters thereon, a second group of shafts each provided with a brush being mounted within said compartment, a hopper for containing impregnating material provided with a meter mechanism for introducing impregnating material into a conduit leading into said compartment, a power source, an electric switch mechanism for controlling the actuation of said power source, means connecting said power source to said support shafts so as to rotate the same and to said brush carrying shafts so as to oscillate the same, other means connecting said power source to said meter mechanism, and still other means driven by said power source for arresting the actuation of the meter mechanism after a predetermined time and subsequently arresting the actuation of the power source.

30. A filter impregnating machine comprising a frame supporting an impregnating box containing a plurality of compartments, a plurality of shafts for supporting filters, rotatably mounted in each compartment, means for securing a filter to each shaft, means for closing a compartment containing filters being impregnated from the remainder of the box, a hopper for impregnating material associated with said frame, a meter in said hopper for introducing impregnating material into a conduit, means for placing said conduit into communication with either compartment, a power source, means for connecting said power source with the filter support shafts of either compartment, other means affording a detachable connection between the power source and the meter mechanism and still other means driven by said power source for breaking the driving connection between said power source and said meter mechanism.

31. A filter impregnating machine comprising a frame supporting an impregnating box containing a plurality of compartments, a plurality of shafts for supporting filters rotatably mounted in each compartment, means for securing a filter to each shaft, means for closing a compartment containing filters from the remainder of the box, a hopper for impregnating material associated with said frame, a meter mechanism in said hopper for introducing impregnating material into a conduit, means for placing said conduit into communication with either compartment, a power source, means for connecting said power source with the filter support shafts of either compartment, other means affording a detachable connection between the power source and the meter mechanism and still other means driven by said power source for breaking the driving connection between said power source and said meter mechanism after a predetermined time of operation and for arresting the operation of said power source subsequent to the breaking of said driving connection.

32. A filter impregnating machine comprising a frame supporting a compartment for containing filters undergoing impregnation, a plurality of hollow shafts rotatably mounted within said compartment, means for supporting a filter on each shaft, a conduit connecting said compartment with a hopper containing impregnating material, a meter mechanism within said hopper for introducing impregnating material into said conduit, a power source, means connecting said power source with said filter support shafts, other means affording a detachable connection between the power source and the meter mechanism, still other means driven by said power source for breaking the driving connection between said power source and said meter mechanism and for subsequently arresting the operation of said power source, and means communicating with each of said hollow shafts for evacuating air from within the filters supported thereon.

33. A filter impregnating machine comprising a frame supporting an impregnating compartment for containing filters, a plurality of filter support shafts rotatably mounted within said compartment, means for supporting a filter on each shaft, a conduit connecting said compartment with a hopper containing impregnating material, a meter mechanism associated with said hopper for introducing impregnating material into said conduit, a power source associated with said frame, means connecting said power source with said filter support shafts for rotating the same, other means affording a detachable driving connection between said power source and said meter mechanism, still other means driven by said power source for breaking the connection between the power source and the meter mechanism after a predetermined time of operation and for subsequently arresting the operation of the power source, and means communicating of said compartment for removing therefrom excess filter impregnating material therein.

34. A filter impregnating machine comprising a frame supporting a compartment containing filters undergoing impregnation, a plurality of hollow filter support shafts rotatably mounted within said compartment, means for supporting a filter on each shaft, a conduit connecting said compartment with a hopper containing impregnating material, a meter mechanism within said hopper for introducing impregnating material into said conduit, a power source, means connecting said power source with said filter support shafts, other means affording a detachable connection between the power source and the meter mechanism, still other means driven by said power source for breaking the driving connection between said power source and said meter mechanism and for subsequently arresting the operation of said power source, suction means communicating with each of said hollow shafts, and suction means communicating with the compartment for removing excess filter material deposited therein.

35. A filter impregnating machine comprising a frame supporting a compartment for containing filters undergoing impregnation, a plurality of hollow filter support shafts rotatably mounted within said compartment, means for supporting a filter from each shaft, a plurality of shafts each carrying a brush mounted within said compartment, a hopper containing finely divided impregnating material, a meter mechanism for introducing impregnating material into said compartment, a power source, means for causing said power source to respectively rotate and oscillate the filter support shafts and the brush carrying shafts, other means affording a detachable connection between said power source and said meter mechanism, still other means driven by said power source for breaking the connection between the power source and meter mechanism after a predetermined time of operation and for subsequently arresting the operation of the power source, suction means communicating with said hollow filter support shafts for evacuating air from within the filters carried thereon, and means communicating with the interior of said compartment for removing the excess filter material deposited therein.

36. A filter impregnating machine comprising a frame supporting a compartment for containing a plurality of filters undergoing impregnation, an airtight cover for said compartment, said cover being provided with a distributing manifold communicating with said compartment by a plurality of openings and with a conduit connected to a supply of impregnating material.

37. A filter impregnating machine comprising a frame supporting a compartment for containing filters undergoing impregnation, a cover for said compartment affording an air tight fit with the walls thereof, said cover having a hollow interior, the lower surface of said cover at its center being provided with a slot extending transversely thereof, the upper surface of said cover being provided with an opening on one side of said slot, and a conduit communicating with said opening and with a hopper for impregnating material.

38. A filter impregnating machine comprising a frame supporting an impregnating box containing a plurality of compartments for containing filters undergoing impregnation, an airtight closure for the compartments of said box provided by a cover slidably mounted between the walls of said box, said cover being of a width sufficient to close a compartment, a flexible conduit connecting said cover with a hopper containing impregnating material, and a second conduit connecting said hopper with a supply of gas under pressure.

39. A filter impregnating machine comprising a frame supporting an impregnating box having a plurality of compartments for containing filters undergoing impregnation, an air tight closure for the compartments of said box provided by a cover with a hollow interior slidably mounted between the walls of said box, said cover being of a width sufficient to close a compartment and being provided with a hollow interior, the upper surfaces of the cover communicating through a conduit with a hopper containing impregnating material, a second conduit connecting said hopper with a supply of gas under pressure and the lower surface of said cover being provided with a transversely extending slot for communicating with the interior of the impregnating box.

40. An impregnating machine comprising a frame supporting an impregnating box having a plurality of compartments for containing filters undergoing treatment, an air tight closure for said compartments provided by a cover slidably mounted between the walls of said box, said cover being of a width sufficient to entirely close a compartment, the cover being provided with a hollow interior, the lower surface of said cover being provided at its center with a transversely extending slot, the upper surface of said cover being provided with an opening on one side of said slot, a flexible conduit communicating with said opening and a hopper containing impregnating material, and a second conduit connecting said hopper with a supply of gas under pressure.

41. In a machine having a plurality of mechanism driven by a power source, means for arresting the operation of one of said mechanisms prior to that of the entire machine comprising a detachable drive connection between said power source and said machine, a threaded timer shaft driven by said power source, a half nut engaging said timer shaft and mounted for linear movement along the same, means for causing said timer shaft to rotate a timer control rod and means carried on said rod for breaking the connection between said power source and said mechanism.

42. In a machine having a plurality of mechanisms driven by a single power source, means for arresting the operation of one of said mechanisms and then subsequently the operation of the entire machine, said means comprising a detachable driving connection between said power source and said mechanism, a threaded timer shaft driven by said power source, a half nut engaging said timer shaft and mounted for linear movement along the same, means for connecting said half nut to a timer control shaft for rotating the latter on linear movement of the half nut, means carried by said timer shaft for breaking the driving connection between said power source and said mechanism after a predetermined time of linear movement of said half nut, and a finger carried on said half nut for actuating an electric switch mechanism controlling the operation of the power source.

43. A filter impregnating machine comprising a frame, a compartment for holding filters undergoing impregnation, a plurality of filters rotatively mounted in said compartment, means for impinging directly against said filters finely divided particles of impregnating material, and automatic mechanism for stopping said means to thereby control the degree of impregnation of the filters.

44. A filter impregnating machine comprising a frame, a compartment for holding filters undergoing impregnation, a plurality of filters rotatively mounted in said compartment, means for rotating said filters, means for introducing finely divided particles of impregnating material into said compartment, a source of power for operating both said means, and automatic mechanism for arresting said source of power after a predetermined operation.

45. In a filter impregnating machine, means for supporting a filter and means for directly impinging against said filter air under pressure containing finely divided particles of impregnating material.

46. In a filter impregnating machine, means for rotating a filter undergoing impregnation, and means for directly impinging against said rotating filter air under pressure containing finely divided particles of impregnating material.

47. In a filter impregnating machine, means for rotating a filter undergoing impregnation, means for withdrawing air from the interior of said filter, and means for directly impinging against said filter air under pressure containing finely divided particles of impregnating material.

48. A filter impregnating machine comprising a frame, a filter holding compartment supported by said frame, means for supporting a filter in said compartment, means for rotating said filter, means for supplying finely divided particles of impregnating material to said compartment, and automatic means for cutting off the supply of impregnating material after a predetermined degree of impregnation of said filter.

49. A filter impregnating machine comprising a frame, a filter holding compartment supported by said frame, means for rotatively supporting a filter in said compartment, means for rotating said filter, means for supplying finely divided particles of impregnating material to said compartment, and automatic means for cutting off the supply of impregnating material after a predetermined degree of impregnation of said filter.

50. A filter impregnating machine comprising an impregnating box having a plurality of separate compartments, means for supporting filters for undergoing impregnation in each compartment, and selective means for introducing finely divided impregnating material into any one compartment.

FRANK B. HALE.
FRANK A. LOGAN.